July 15, 1969  L. O. UPTON  3,455,668
METHOD OF MAKING OPTICAL COUPLING DEVICES
Filed May 25, 1966  2 Sheets-Sheet 1
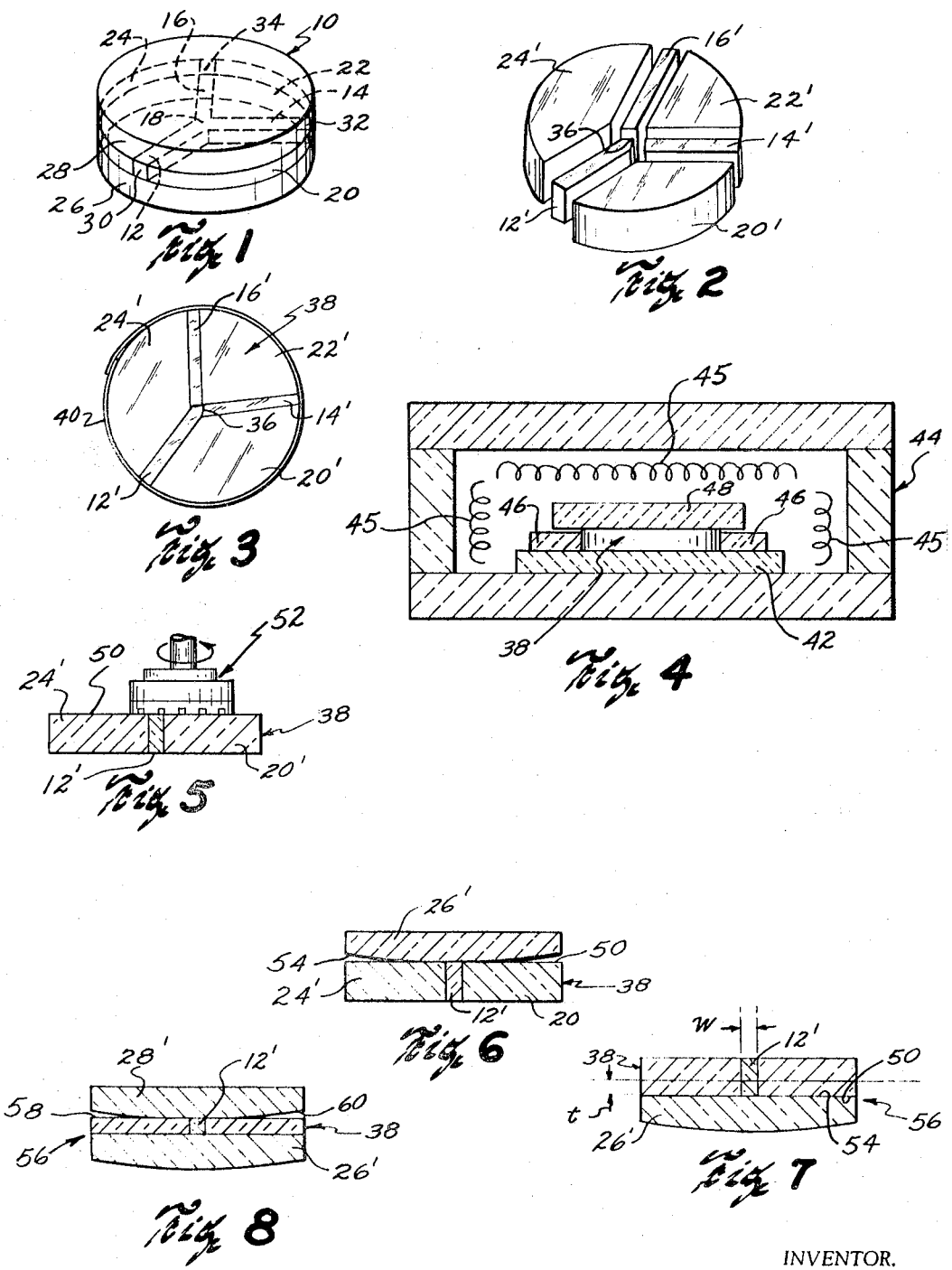
INVENTOR.
LEE O. UPTON
BY
ATTORNEY July 15, 1969  L. O. UPTON  3,455,668
METHOD OF MAKING OPTICAL COUPLING DEVICES
Filed May 25, 1966  2 Sheets-Sheet 2

INVENTOR.
LEE O. UPTON
BY
ATTORNEY

United States Patent Office 3,455,668
Patented July 15, 1969

3,455,668
METHOD OF MAKING OPTICAL COUPLING DEVICES
Lee O. Upton, Sturbridge, Mass., assignor, by mesne assignments, to American Optical Corporation, a corporation of Delaware
Filed May 25, 1966, Ser. No. 552,895
Int. Cl. C03b *23/22*
U.S. Cl. 65—38
2 Claims

ABSTRACT OF THE DISCLOSURE

Forming light-channeling glass wafers of long and thin rectangular pieces of glass of preselected relatively high refractive index arranged in a Y formation on a flat glass element and separated by intimately interfitted glass wedges of lower refractive index wherein the assembly of pieces and wedges are fused assembled into a unitary structure whereby light may be channeled through the Y arrangement of the high refractive index glass independently of the other components.

---

This invention relates to the manufacture of fused glass light-conducting devices and has particular reference to a method of making devices for conducting light along a number of discrete paths by total internal reflection.

According to principles of the present invention such devices are formed of strips of relatively high refractive index glasses having their sides surrounded by pieces of lower refractive index glass. The strips and pieces of glass are fused together as units in such a manner that between the relatively high and low refractive index glasses of each unit there are formed light-reflecting interfaces which function according to the principles of total internal reflection to propagate light discretely through the glass strips. Thus, the glass strips become light-conducting channels in the completed units or devices.

It is contemplated that light-conducting devices formed according to the method of the present invention may each comprise either a single light-conducting channel or a plurality of such channels junctioned together therewithin. When of single channel construction, the devices become natural candidates for coupling one light path to another and when the devices are of the aforementioned multi-channel type, their utility extends to that of distributing light between a number of discrete light paths or collecting light from multiple paths to a lesser number or single path.

An object of the present invention is to provide a simple, economical and overall highly efficacious method of making light-conducting devices of the aforementioned character; and A further object is to provide, a novel technique of preselecting, cutting, polishing, assembling and fusing together a number of different glasses in such a manner as to yield such light-conducting devices on reliably repetitive basis.

The present invention will be more fully understood by reference to the following detailed description which is accompanied by a drawing in which FIG. 1 illustrates, in perspective, one type of glass light-conducting device which may be formed by a method employing principles of the invention;

FIG. 2 is a perspective view of an arrangement of glass pieces used to form an intermediate light-conducting section of a device such as that depicted in FIG. 1;

FIGS. 3–9 illustrate procedural steps and exemplary apparatus employed in one aspect of the present invention;

Figure 9:
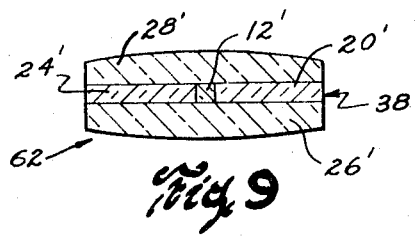

Referring now to FIG. 1, there is shown light-conducting device 10 which is exemplary of one of various forms of fused glass structures which may be fabricated according to principles of this invention.

Device 10 comprises three relatively long and thin light-conducting channel members 12, 14 and 16 arranged in a Y formation with their corresponding one ends fused together so as to form junction 18. Channel members 12, 14 and 16 are each constructed of glass having a relatively high refractive index and are radially spaced from one another by glass wedges 20, 22 and 24 each having a lower refractive index than that of the channel members. Completing the structure of device 10 are plates 26 and 28 of low refractive index glass between which the combination of channel members 12, 14, 16 and wedges 20, 22, 24 is interposed.

The channel members, wedges and plates are all fused together to form a unit within which all of the sides of channel members 12, 14 and 16 of relatively high refractive index glass are entirely surrounded by glasses of lower refractive index. Thus, light-reflecting interfaces are formed between the relatively high and low refractive index glasses which render channel members 12, 14 and 16 and junction 18 transmissive to light according to the well-known principles of total internal reflection.

Outermost ends 30, 32 and 34 of the channel members are optically polished or otherwise finished so as to be readily receptive and/or emissive to light when device 10 is used to interconnect a number of discrete light paths. Light directed into a preselected one of channel members 12, 14 and 16 (e.g. member 12) will become divided at junction 18 and emitted from both of the remaining channel members (e.g. members 14 and 16) while light directed simultaneously into the two channel members 14 and 16 will be combined at junction 18 and emitted by channel member 12.

According to principles of the present invention, light-conducting devices such as device 10 are produced as follows:

Glass pieces 12', 14', 16', 20', 22' and 24' (see FIG. 2) each having the transverse configuration and size desired of channel members 12, 14, 16 and wedges 20, 22, 24 respectively are cut from glass stock. The stock is preselected according to the aforementioned requirements of relatively high and low refractive index in channel members 12, 14, 16 and wedges 20, 22, 24 respectively. The glasses are further so selected that the high and low refractive index pieces are compatible in their softening points and expansion coefficients so as to permit subsequent fusion of one to another without the creation of undue strain or stresses therewithin.

Typical of glasses which may be used to form the combination of pieces 12', 14', 16' and 20', 22', 24' are flint and crown glasses respectively. Glasses actually used and tested after fusion comprised pieces 12', 14' and 16' formed of flint glass having an index of refraction of approximately 1.70, and expansion coefficient of approximately $92 \times 10^{-7}/°$ C. and softening point of approximately 549° C. Pieces 20', 22' and 24' were formed of crown glass having an index of refraction of approximately 1.52, expansion coefficient of approximately $93 \times 10^{-7}/°$ C. and softening point of approximately 700° C.

Pieces 12', 14', 16' and 20', 24', 26' are cut to a substantially greater thickness dimension than that ultimately desired of their fused combination in the finished device 10 so that they can be more easily handled during assembly and warpage of the assembly during fusion is minimized. The corresponding one ends of pieces 12', 14' and 16' which are intended to form junction 18 of device 10 are arranged so as to interfit with one another. In this respect, a roof-shaped edge 36 (FIGS. 2 and 3) is provided on one piece (e.g. piece 12') against which corresponding edges of the other two pieces are positioned as shown in FIG. 3. These edges of pieces 12', 14' and 16', their side walls and the corresponding walls of pieces 20', 24' and 26', all of which are intended to be fused to one another, are highly polished and thoroughly cleaned. Thereupon, all pieces 12', 14', 16' and 20', 22', 24' are brought together as assembly 38 (FIG. 3).

Assembly 38 is bound with asbestos paper-type tape 40 or an equivalent banding material which is capable of withstanding such relatively high temperatures as are required for fusing the assembly and characteristically contracts when heated. The bound assembly 40 is then place upon a silicon carbide slab 42 within furnace 44 (see FIG. 4). It is blocked peripherally and capped with additional pieces 46 and 48 respectively of silicon carbide or a similar material which, when heated, will function to distribute the heat substantially uniformly over assembly 38.

Clearance may be provided between pieces 46 and cap 48 so that, by its own weight, cap 48 will exert a slight downwardly directed pressure upon assembly 38. This is advantageous in that, along with the effect of contraction of tape 40 and normal expansion of the glasses during heating, it produces a tightening of the assembly. Such tightening not only induces quicker fusion, i.e. at slightly lower than usual fusing temperatures, and prevents warpage but also avoids the possibility of interstitial voids occurring between the glass pieces of assembly 38.

Furnace 44 is heated electrically by heating coils 45 or by gas burners (not shown) to the fusing temperature of assembly 38 and held at such temperature until complete fusion is achieved. The fused assembly is then annealed and allowed to cool sufficiently to permit handling thereof.

A temperature of approximately 1200° F. may be used to fuse together an assembly 38 of approximately 3 inches in diameter and ⅜ inch thick composed of the aforementioned flint and crown glasses. Following fusion, annealing may be accomplished by dropping the temperature in furnace 44 to about the middle of the annealing range of the crown glass (e.g. between 940° F. and 1050° F.) and holding such temperature for a period of approximately 2 hours until the assembly becomes substantially completely stress annealed. Thereafter the temperature in furnace 44 should be dropped slowly at a rate of from 5 to 10 degrees per minute until it reaches the range of from 300° F. to 400° F. and then cooled to a handling temperature.

After annealing and cooling, the fused assembly 38 is removed from furnace 44, stripped of tape 40 and one face thereof is ground flat and highly polished so as to form surface 50 (see FIG. 5). Conventional glass surfacing apparatus may be employed for the grinding and polishing operation. Exemplary of one such apparatus is the well-known form in which, with the application of loose grinding abrasives followed by polishing media, axially rotated grinding and polishing tools respectively are moved back and forth in one plane along continually varying paths over the surface to be formed. Such apparatus is illustrated in FIG. 5 only to the extent of tool 52 which is intended to represent either a grinding or polishing tool or lap.

Following the aforesaid grinding and polishing of surface 50 of assembly 38, glass plate 26' is placed thereupon (see FIG. 6). Plate 26' corresponds to plate 26 in device 10 (FIG. 1). Surface 54 of plate 26' is formed to a slightly convex spherically curved shape and is highly polished for fusion to surface 50 of assembly 38. The curved configuration of surface 54 causes plate 26' to make substantially only point contact with flat surface 50 so that fusion thereof to surface 50 will first occur at the contact point and progress radially therefrom toward outer edges of plate 26' along surface 50 of assembly 38. Thus, air and gases are squeezed outwardly from between surfaces 50 and 54 during the fusing operation. This provides a substantially completely bubble free fused interface between plate 26' and assembly 38.

Plate 26' is preferably, but not necessarily, formed of glass having the same refractive index value and expansion coefficient as pieces 20', 22' and 24' of assembly 38. If there is any difference, the refractive index of plate 26' should be substantially lower than that of pieces 12', 14' and 16' and it must be compatible for fusion thereto without the introduction of excessive internal stress or strain.

With surfaces 50 and 54 thoroughly cleaned and plate 26' positioned upon assembly 38 substantially as shown in FIG. 6, the combination is placed in furnace 44. It is fused, annealed and cooled according to the procedure and schedule described hereinabove with relation to the previous fusing of assembly 38.

Following completion of its fusion, annealing and cooling, the combination of assembly 38 and plate 26' is removed from furnace 44 as fused unit 56 (see FIG. 7). Assembly 38 thereof is then ground to a reduced uniform thickness $t$ which, preferably but not necessarily approximates the width or transverse dimension $w$ of glass pieces 12', 14' and 16' which ultimately become the aforementioned light-conducting channels 12, 14 and 16 in device 10. Assembly 38 may be ground to greater or lesser thicknesses $t$ if it is desired to form channels 12, 14 and 16 which are of rectangular cross-sectional shape rather than the square shape which results from making dimension $t$ equal to dimension $w$ in FIG. 7.

In all cases, the resulting surface 58 (FIG. 8) is optically polished and thoroughly cleaned. A second thoroughly cleaned plate 28' which is similar to plate 26' is placed upon surface 58 with its convex surface 60 making point contact with surface 58. The combination of the already fused unit 56 and plate 28' is subjected to a third fusing, annealing and cooling cycle identical to that already described with relation to the forming of fused assembly 38 and unit 56. Resulting therefrom is fused unit 62 (FIG. 9) which constitutes device 10 shown in FIG. 1. Corresponding parts of unit 62 and device 10 (FIGS. 9 and 1 respectively) are referenced with like numerals which, in FIG. 9, are separately identified each with a prime mark.

Figure 10:
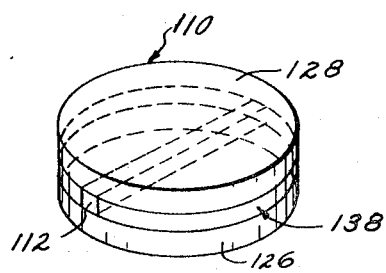
FIG. 10 is an illustration, in perspective, of an alternate form of light-conducting device which may be formed by the method of the present invention.

FIG. 10 illustrates an alternate form of fused glass light-conducting device 110 which may be formed according to the present invention. Device 110 is similar in all respects to device 10 if FIG. 1 with the exception of its having only one light-conducting channel, rather than three. Light-conducting channel 112 of device 110 extends diametrically thereacross. Device 110 includes an intermediate assembly 138 which is fused in interposed relationship between plates 126 and 128.

Figure 11:
FIGS. 11–14 illustrate steps employed in fabricating the latter type of light-conducting device.

Assembly 138 is formed by cutting from glass stock a strip 112' and two semi-circular flat pieces 64 (see FIG. 11). The glasses of strip 112' and pieces 64 are respectively selected in the same manner as described for any one of pieces 12', 14', 16' and 20', 22', 24' so as to have the relatively high and low refractive index values which are required to ultimately cause channel 112 to conduct light by total internal reflection.

Figure 12:
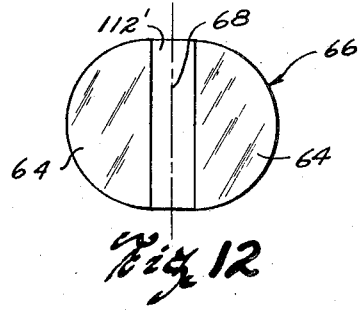
Figure 13:
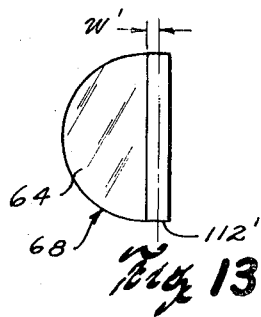
Figure 14:
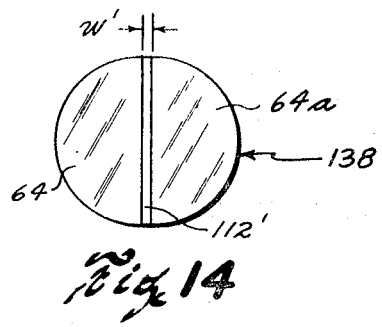

The relatively high refractive index glass strip 112' and lower refractive index glass pieces 64 are fused in side-by-side relationship to form unit 66 (FIG. 12). Unit 66 is cut in half along line 68 to form sub-assembly 68 (FIG. 13) comprised of one piece 64 and one half of strip 112'. The one half of strip 112' is then ground and polished to a uniform width $w'$ equal to that desired of channel 112 in device 110. An additional semi-circular glass piece 64a which is identical in all respects to either one of pieces 64 of FIG. 11 is placed against the ground and polished side of the width $w'$ of glass strip 112' as shown in FIG. 14. Piece 64a is fused to strip 112' to form assembly 138.

Glass plates 126 and 128 (FIG. 10) are fused to opposite faces of assembly 138 to complete the structure of device 110. Plates 126 and 128 are applied to assembly 138 in the manner described hereinabove with relation to the application of plates 26' and 28' to assembly 38.

All fusing operations mentioned in the description just given regarding the fabrication of device 110 are performed according to the procedure and schedule of heating, annealing and cooling outlined earlier with regard to the fabrication of device 10 of FIG. 1.

I claim:
1. A method of making a fused glass light-channeling Y-junction device including three long and thin rectangular channel members of glass having a high refractive index, three wedge-shaped side pieces of glass having a lower refractive index than any one of said channel members, and a pair of glass cover plates also of a lower refractive index than that of said channel members wherein the method comprises the steps of:

arranging said channel members in a Y formation with one end of each adjoining corresponding ends of remaining members at the junction of said formation and placing said side pieces between extensions of said channel members with wedge shaped edges thereof disposed against corresponding sides of said channel members whereby fusion of adjoining ends of said channel members to each other and sides thereof to said side pieces will form an integrated structure having internally light-reflective interfaces along two of said sides of said channel members for conducting light entering any external end of said channel members and traveling to and through said junction by the principles of total internal reflection;

fusing said channel members and side pieces together to form said integrated structure;

annealing and cooling the fused structure;

grinding and polishing a flat surface on one side of said structure across an exposed third side of said junctioned channel members;

placing one of said cover plates over said third side;

fusing said one plate to said flat surface to form a third internally light-reflecting interface along said junctioned channel members;

annealing and cooling the fused assembly;

gringing and polishing a flat surface on the opposite side of said structure across the exposed fourth side of said junctional channel members;

placing the other of said cover plates over said fourth side of said channel members against said structure;

fusing said other plate to said structure to form a fourth internally reflecting interface along said channel members; and annealing and cooling the whole assembly whereby said channel members will transmit light entering any external end of said channel members to and through said junction by total internal reflection along all four sides of said integrated Y formation.

2. The method according to claim 1 wherein one side of each of said glass cover plates is spherically convex and is placed approximately centrally upon its respective side of said fused structure thereby initially making substantially only point contact with said structure whereby during said step of fusing said plate, the fusion to said side of said structure will progress radially from said contact point.

References Cited
UNITED STATES PATENTS

| | | | |
|---|---|---|---|
| 1,588,783 | 6/1926 | Tillyer | 65—37 XR |
| 1,729,654 | 10/1929 | Watson et al. | 65—38 |
| 2,033,573 | 3/1936 | Hancock | 65—37 XR |
| 2,035,827 | 3/1936 | Newell | 65—38 |
| 2,054,166 | 9/1936 | Reh | 65—38 |
| 2,297,122 | 9/1942 | Ziegler | 65—38 XR |
| 2,915,661 | 12/1959 | Lederer. | |
| 3,278,283 | 11/1966 | Bazinet | 65—38 XR |
| 3,354,007 | 11/1967 | Michelitsch. | |

S. LEON BASHORE, Primary Examiner

F. W. MIGA, Assistant Examiner

U.S. Cl. X.R.

65—4, 56, 61, 155; 350—96, 169